(12) United States Patent
White et al.

(10) Patent No.: US 6,957,171 B2
(45) Date of Patent: Oct. 18, 2005

(54) SYSTEM AND METHOD FOR MONITORING AND CONTROLLING GASEOUS FUEL STORAGE SYSTEMS

(75) Inventors: Nicholas Peter White, Belleville (CA); Bryan Chris Lung, Saskatoon (CA)

(73) Assignee: Saskatchewan Research Council, Saskatoon (CA)

( * ) Notice: Subject to any disclaimer, the term of this patent is extended or adjusted under 35 U.S.C. 154(b) by 47 days.

(21) Appl. No.: 10/417,113

(22) Filed: Apr. 17, 2003

(65) Prior Publication Data

US 2003/0233206 A1 Dec. 18, 2003

Related U.S. Application Data

(60) Provisional application No. 60/373,645, filed on Apr. 19, 2002.

(51) Int. Cl.[7] .................................................. G05D 7/00
(52) U.S. Cl. ..................... 702/188; 73/1.16; 700/283
(58) Field of Search ................................ 73/1.25–1.26, 73/1.35–1.36, 1.57, 861.01, 514.05, 514.06, 514.07, 1.16; 702/33–36, 45, 47, 50, 55, 113–114, 130, 138, 140–141, 179, 188, 181–185; 700/12–13, 19, 231, 281–283, 299, 301, 304

(56) References Cited

U.S. PATENT DOCUMENTS

| | | | | |
|---|---|---|---|---|
| 4,427,132 A | * | 1/1984 | Thomson | 222/23 |
| 4,984,449 A | * | 1/1991 | Caldwell et al. | 73/49.2 |
| 5,379,637 A | | 1/1995 | Abowd et al. | |
| 5,748,500 A | * | 5/1998 | Quentin et al. | 702/182 |
| 5,789,082 A | * | 8/1998 | Treadway | 428/412 |
| 5,944,067 A | * | 8/1999 | Andersson | 141/59 |
| 6,006,720 A | * | 12/1999 | Yanagihara et al. | 123/305 |
| 6,032,699 A | * | 3/2000 | Cochran et al. | 138/104 |
| 6,041,762 A | | 3/2000 | Sirosh et al. | |
| 6,405,744 B1 | * | 6/2002 | LaPant | 137/1 |
| 6,461,751 B1 | * | 10/2002 | Boehm et al. | 429/13 |
| 6,691,061 B1 | * | 2/2004 | Rogers et al. | 702/156 |

* cited by examiner

*Primary Examiner*—Marc S. Hoff
*Assistant Examiner*—Mary Catherine Baran
(74) *Attorney, Agent, or Firm*—Oblon, Spivak, McClelland, Maier & Neustadt, P.C.

(57) ABSTRACT

A gaseous fuel storage system included in a vehicle to supply fuel to a power source (e.g., an engine, fuel cell and the like) is diagnosed and controlled by a monitoring/evaluation and control system. Various parameters with reference to gas temperature, gas pressure, gas density and damage and shock of a vessel containing the pressurized gas are provided by respective sensors mounted on and in vessels of a gas storage system. A control module determines whether maintenance of the vessels is required based on the sensed parameters. If maintenance is necessary, the components will be replaced with new ones or the entire gas storage system or the vessel will be replaced. If necessary, a warning is provided to avoid operation of the power source and the vehicle.

18 Claims, 18 Drawing Sheets

SYSTEM AND METHOD FOR MONITORING AND CONTROLLING GASEOUS FUEL STORAGE SYSTEMS

CROSS-REFERENCE TO RELATED APPLICATIONS

Benefit and priority is claimed to U.S. provisional application Ser. No. 60/373,645 filed Apr. 19, 2002, which is currently pending and is hereby incorporated by reference into this application.

FIELD OF THE INVENTION

The present invention relates to the field of gaseous fuel storage systems and more particularly to monitoring/evaluating, diagnostic/prognostic and control systems and methods for these systems.

BACKGROUND OF THE INVENTION

In applications where in-service use of a gaseous fuel storage system is unknown to a manufacturer of the system, designing a safe system is challenging due to many factors that can contribute to failure of various components of the system. A failure of a component of a high-pressure storage system can have consequences that range from inconvenience to catastrophic.

An example where a manufacturer cannot predict the in-service use is on vehicles where gaseous fuels such as hydrogen and natural gas can be used as a replacement for conventional liquid fuels for transportation. These new fuels are consumed in internal combustion engines, fuel cells, turbines or other devices to provide motive or auxiliary power to vehicles either directly or indirectly.

Although these fuels can be stored in a variety of ways, they are most commonly stored as a high-pressure gas in a high-pressure storage system.

To prevent failures, typical systems are designed to have a service life that exceeds normal usage. As well, certain maintenance and inspection procedures are required during the time that the storage system is in service. Since the useful life of a storage system is determined by a variety of factors, there is a need for systems and methods that are capable of correlating these factors accurately with design parameters to determine the remaining service life of a given storage system.

In addition, a fuel storage diagnostic system can be used with other components on a vehicle to enhance diagnostics and to improve safety and convenience. As well, since gaseous fuels are under pressure, a small leak, which may not be detected in normal operations, over time can release substantial quantities of fuel and detecting such occurrences would be useful to users.

SUMMARY OF THE INVENTION

In accordance with one aspect of the present invention there is provided a monitoring/evaluation and control system for a compressed gas fuel storage system having a storage vessel and associated operating components, the system comprising: a mechanism configured and adapted to store data related to design characteristics of the storage vessel and the associated operating components of the compressed gas fuel storage system, the data being representative of useful life characteristics of the storage vessel and the associated operating components; a mechanism configured and adapted to sense operating parameters of the storage vessel and the associated operating components, the operating parameters being related to the useful life of the storage vessel and the associated operating components; and a mechanism configured and adapted to evaluate the sensed operating parameters with the stored data to determine a status of the compressed gas fuel storage system.

In an exemplary embodiment of the present invention there is provided a monitoring and control system for a compressed gas fuel storage system having a storage vessel monitored by a plurality of sensors, each sensor generating an operating parameter signal, the system comprising: an input controller for managing gas flow to the compressed gas fuel storage system; an output controller for managing gas flow from the compressed gas fuel storage system; and a control system for managing the input controller and the output controller, the control system including: a memory module for storing data related to design characteristics of the storage vessel, the data being representative of useful life characteristics of the storage vessel; an input signal converter for receiving and conditioning the operating parameter signals from the plurality of sensors, the operating parameter signals being related to useful life characteristics of the storage vessel; a processor module for evaluating the conditioned operating parameter signals provided by the input signal converter in relation to the data stored in the memory module to determine a status of the compressed gas fuel storage system; an output signal converter for generating drive warning indicators based on the status of the compressed gas fuel storage system for controlling the input controller and the output controller; and a system status module managed by the processor module for allowing in-service switching to change operating modes of the fuel storage system.

In accordance with another aspect of the present invention there is provided a method of monitoring/evaluating and controlling a compressed gas fuel storage system having a storage vessel and associated operating components, the method comprising: storing data related to design characteristics of the storage vessel and the associated operating components of the compressed gas fuel storage system, the data being representative of useful life characteristics of the storage vessel and the associated operating components; sensing operating parameters of the storage vessel and the associated operating components, the operating parameters being related to the useful life of the storage vessel and the associated operating components; and evaluating the sensed operating parameters with the stored data to determine a status of the compressed gas fuel storage system.

In a further exemplary embodiment of the present invention there is provided a method of monitoring and controlling a compressed gas fuel storage system having a storage vessel monitored by a plurality of sensors, each sensor generating an operating parameter signal, the method comprising: storing data related to design characteristics of the storage vessel, the data being representative of useful life characteristics of the storage vessel; receiving the operating parameter signals from the plurality of sensors, the operating parameter signals being related to useful life characteristics of the storage vessel; evaluating the operating parameter signals received by the input signal converter in relation to the data stored in the memory module to determine a status of the compressed gas fuel storage system; generating drive warning indicators based on the status of the compressed gas fuel storage system for managing gas flow to and from the compressed gas fuel storage system; and switching between a plurality of operating modes of the fuel storage system in response to service requests.

DETAILED DESCRIPTION

Figure 1:
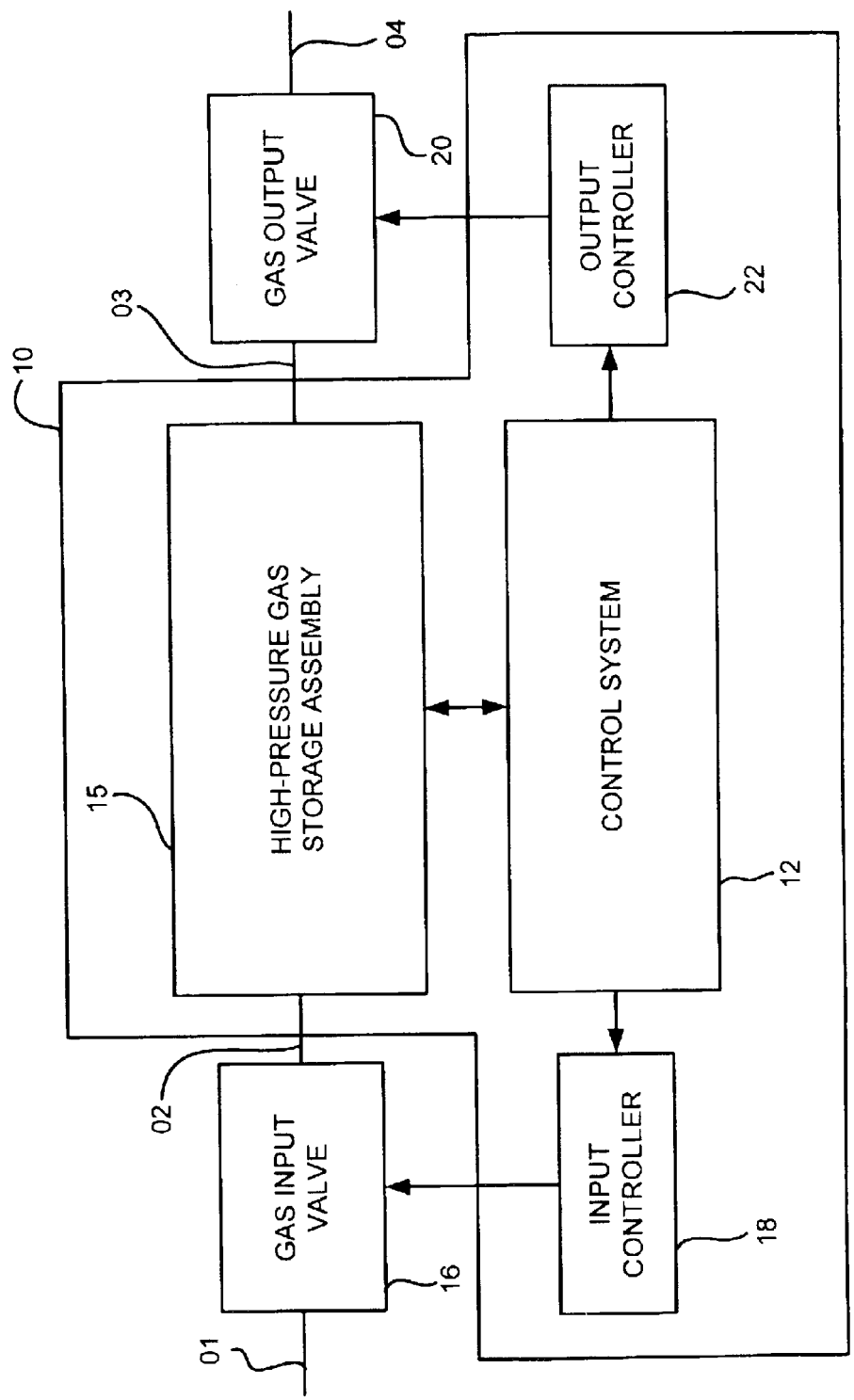
FIG. 1 shows a schematic representation of a high-pressure gas storage diagnostic system according to an embodiment of the present invention.

An overview of a high-pressure gas storage system 10 according to the present invention is described with reference to FIG. 1. A control system 12 is used to manage a high-pressure gas storage assembly 15, which can include one or more storage vessels 14 together with appurtenances such as valves, pressure relief devices, manifolds and other components necessary for its function that are well known to those skilled in the art.

The storage assembly 15 is filled from a gas line 01 through a gas input valve 16, controlled by an input controller 18, and ultimately to the storage assembly 15 through a gas line 02. Gas is withdrawn through from the storage assembly 15 through a gas line 03 by a gas output valve 20, controlled by an output controller 22, and ultimately through a gas line 04. The input/output controllers 18 and 22 are managed by the control system 12.

Figure 2:
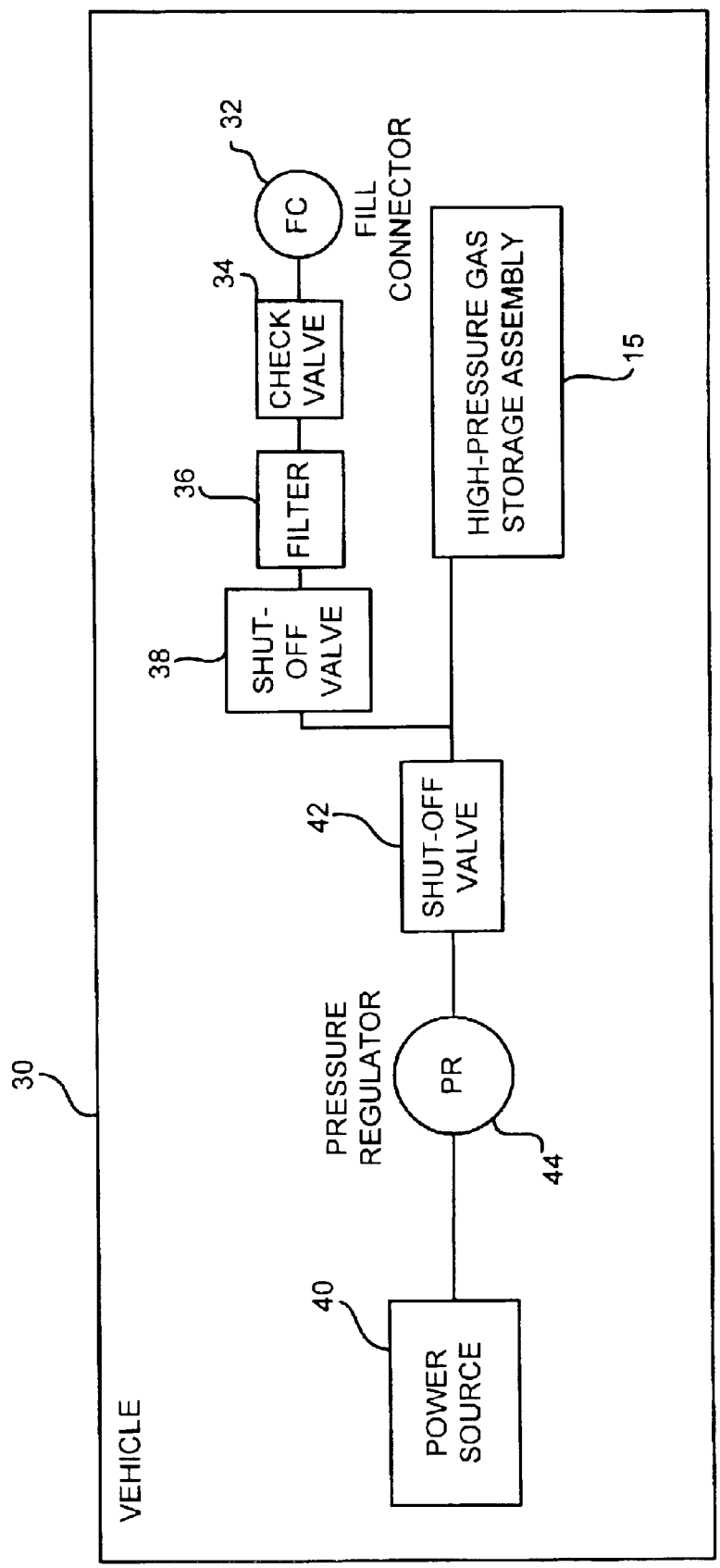
FIG. 2 shows a schematic representation of the system of FIG. 1 in an example operating-environment.

An example installation of the components shown in FIG. 1 in a vehicle 30 is illustrated in FIG. 2. A fill connector 32, separate from or connected to a check valve 34 and a filter 36, is connected with high-pressure gas lines to a solenoid shut-off valve 38 (a specific example of the gas input valve 16 of FIG. 1) and then to the storage assembly 15. Gas to drive a power source 40 (e.g., an engine, fuel cell and the like) is withdrawn through high-pressure lines to another solenoid shut-off valve 42 (a specific example of the gas output valve 20) and a pressure regulator 44 (to reduce pressure of gas coming from the storage assembly 15).

As will be known to those skilled in the art, the elements discussed above may incorporate multiple features and their specific location on a particular vehicle can vary based on considerations of safety and convenience. When multiple storage vessels are used, provisions are made to manifold the vessels according to established techniques.

Figure 3:
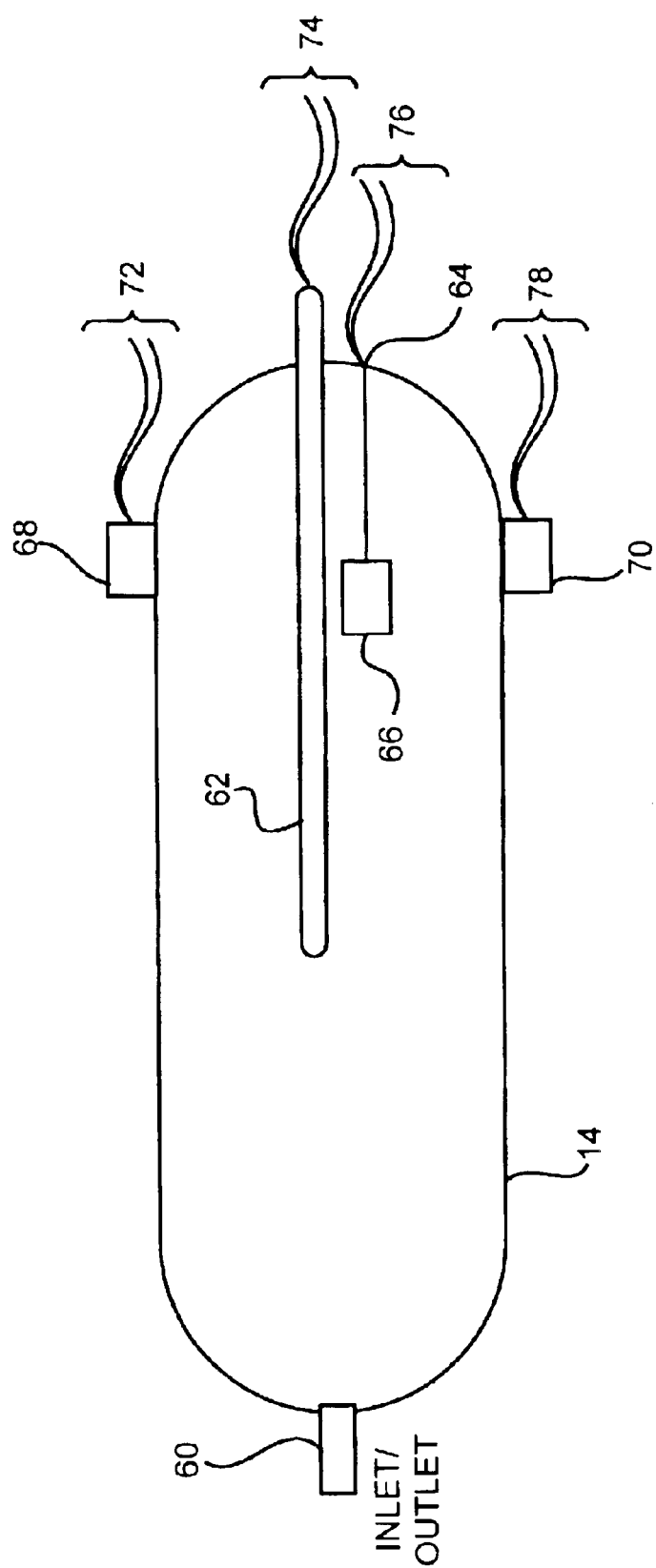
FIG. 3 shows a schematic representation various sensors installed on the storage vessel according to an embodiment of the present invention.

Referring to FIG. 3, an example installation of sensors (e.g., temperature, pressure, shock etc.) on a storage vessel 14 (an example sub-component of the high pressure gas storage assembly 15) is shown. The sensors can either be attached to an outside surface of the vessel 14 or be integrally formed with the vessel 14 in the case of composite constructions. The vessel 14 has an inlet/outlet opening 60 for filling and withdrawal of gas, an internal temperature sensor 62 and a gas pressure sensor 66 mounted in the vessel 14 through a gas-tight opening 64. An alternative arrangement (not shown) involves fitting the internal temperature sensor 62 and the gas pressure sensor 66 through a single opening (e.g., the inlet/outlet 60).

A damage sensor 68 is mounted on the vessel 14. A shock sensor 70 (e.g., an accelerometer) can be mounted on the vessel 14 or on a member (not shown) that is rigidly connected with the vessel 14. Electrical leads 72, 74, 76 and 78 connected to the respective sensor 68, 62, 66, 70 to provide operating parameter signals to the control system 12 (discussed in more detail in conjunction with FIG. 4).

The placement of the sensors 62, 66, 68 and 70 shown in FIG. 3 is merely exemplary and the specific placement of the sensors 62, 66, 68, and 70 to obtain readings will be known to those skilled in the art. Further, a multiplicity of sensors may be required to accommodate storage systems that use a number of gas storage vessels or to provide a redundancy in measurements.

Figure 4:
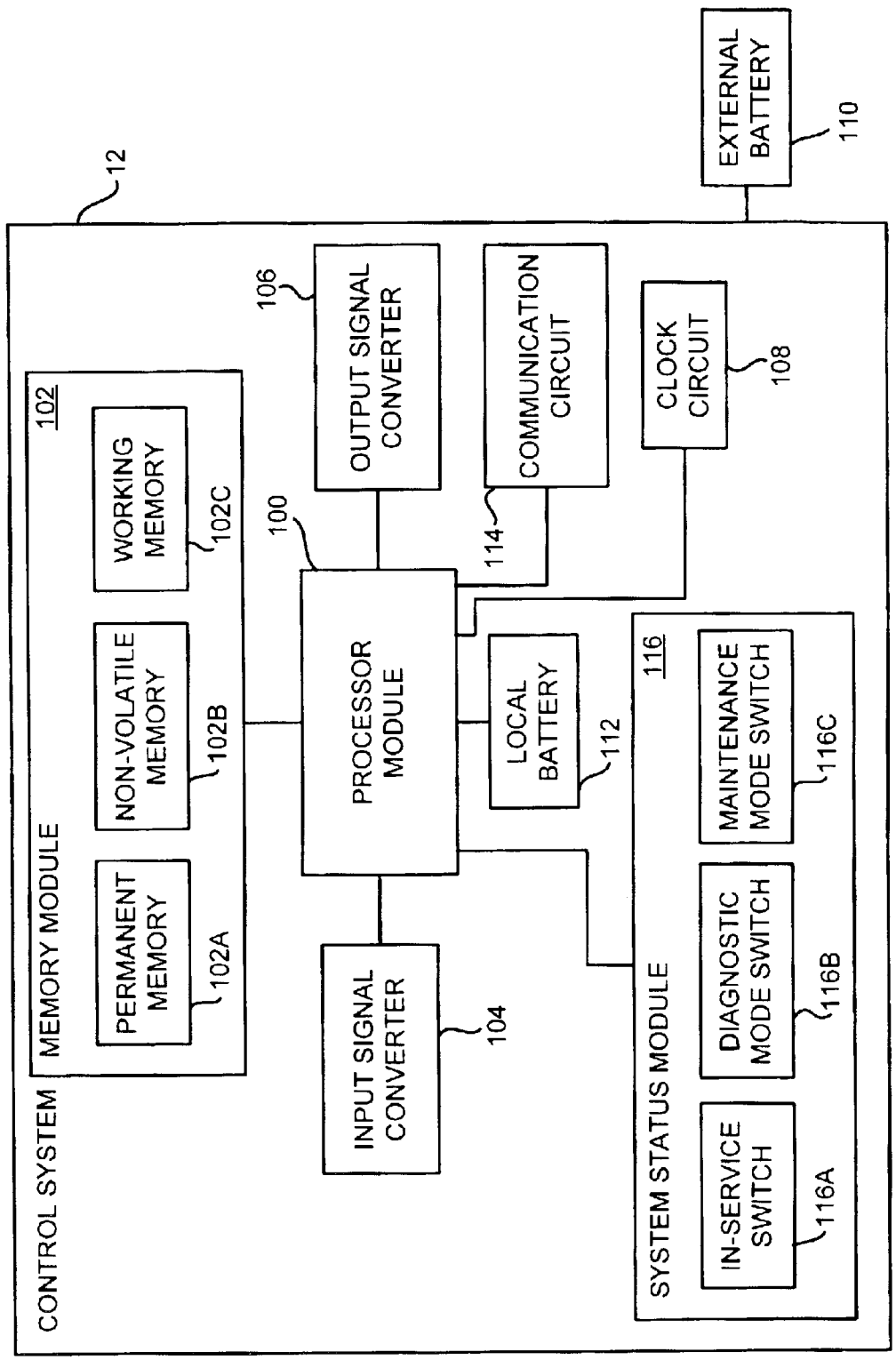
FIG. 4 shows a block diagram illustrating the control system of FIG. 1.

Details of the control system 12 are shown in the block diagram of FIG. 4. The control system 12 includes a processor module 100, which communicates with a memory module 102, which includes a permanent memory 102A, a non-volatile memory 102B and a working memory 102C. Communication is established with the sensors 62, 66, 68, and 70 and other inputs through an input signal converter 104 that includes a series of input connectors and circuits to convert and condition the operating parameter signals from the sensors 62, 66, 68, and 70 to digital values for further processing. The processor module 100 is also in communication with an output signal converter 106 that includes output circuits and connectors to convert digital signals to analogue values to drive warning indicators as discussed further below.

A clock circuit 108 is provided to enable the control system 12 to measure current time and establish time for events. Power for the control system 12 can be provided from an external battery 110 in the vehicle 30 and/or from an additional local battery 112, which can be used to maintain power to the control system 12 in the event that the external battery 110 is unavailable.

A communication circuit 114 is provided to enable the control system 12 to be programmed and to provide more detailed information regarding operation of the control system 12 for operators, installers, and maintenance personnel. The communication circuit 114 can also enable the control system 12 to communicate with other electronic systems such as those aboard the vehicle 30, fuel dispenser, or other equipment. A system status module 116, in communication with the processor module 100, provides functionality to the control system 12 by allowing in-service switching activated by an in-service switch 116A, diagnostic switching activated by a diagnostic mode switch 116B and maintenance mode switching activated by a maintenance mode switch 116C.

Figure 5:
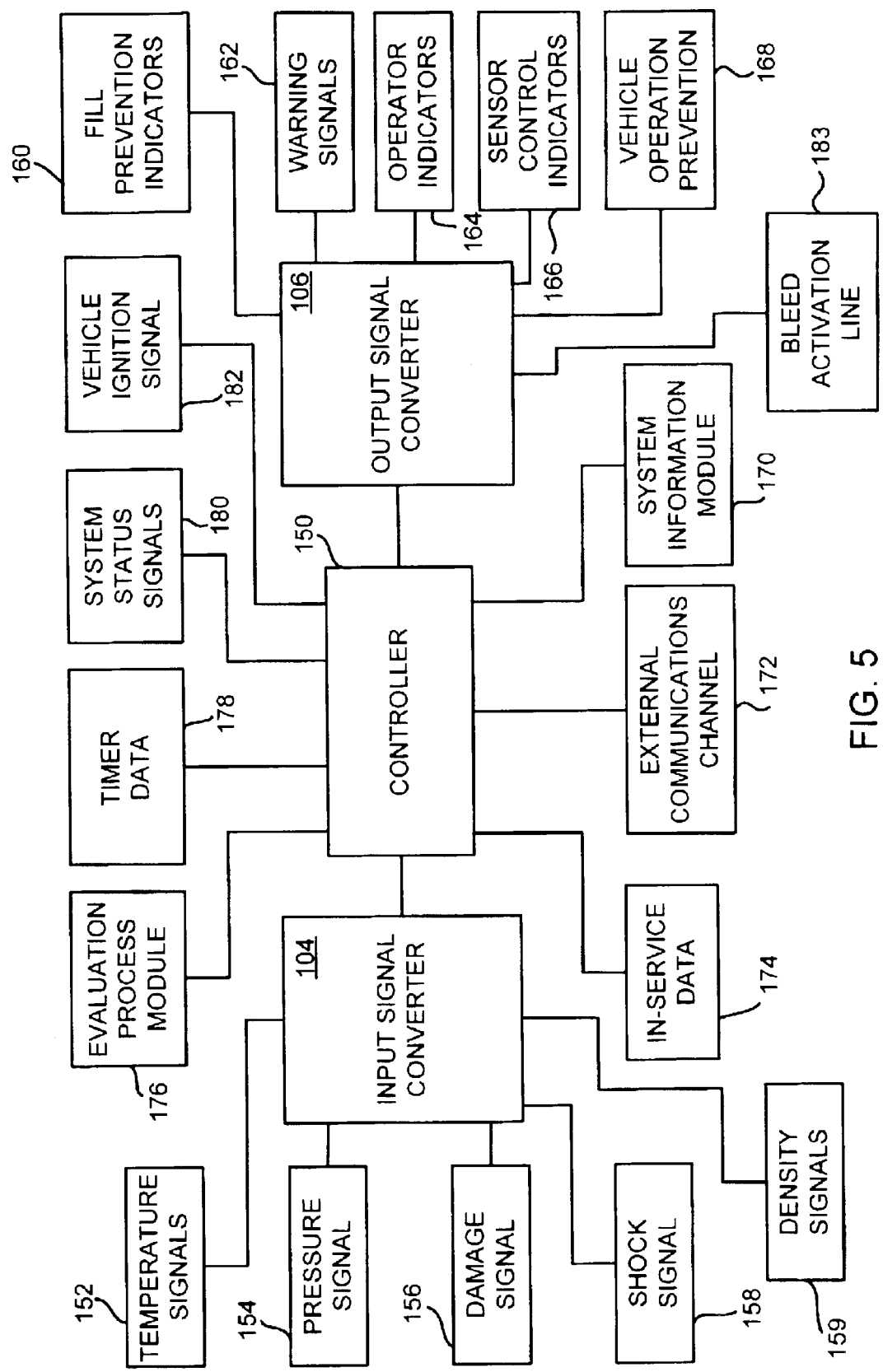
FIG. 5 shows a block diagram illustrating data flow and signal management of the control system of FIG. 4.

Features of the operation of the control system 12 according to the present invention are discussed with reference to FIG. 5. As an overview, a controller 150 coordinates the flow of data from the sensors 62, 66, 68, and 70 generating various signals to establish various actions/indicators. The terms actions and indicators are related in that an action may be to set an indicator signal or perform a specific function.

In particular, as discussed above, the following signals are passed to the input signal converter 104 for conditioning and analogue to digital conversion for handling by the controller 150: (a) internal and external temperature signals 152 such as from the internal temperature sensor 62; (b) pressure signals 154 from the pressure sensor 66; (c) damage signals 156 from the damage sensor 68; (d) shock signals 158 from the shock sensor 70 and density signals 159.

After processing by the controller 150 (discussed below) digital signals generated by the controller 150 are passed to the output signal converter 106 for digital to analogue conversion to generate a series of indicators/actions: (a) a fill prevention (or restriction) control line indicator 160; (b) a warning signal indicator 162; (c) an operator indicator 164; (d) a sensor control line indicator 166; and a vehicle operation prevention (or restriction) line indicator 168.

More specifically, activation of the in-service switch 116A in the switching module 116 (refer to FIG. 4) allows power to be supplied to the processor module 100, which uses the controller 150 to access system information from the system information module 170 and perform self-diagnostics to ensure that the electronics of the control system 12 are functioning correctly.

If an error is detected, the control system 12 shuts down and can be accessed through an external communications channel 172 after the diagnostic mode switch 116B of the switching module 116 is closed. If the control system 12 is operating correctly, a signal may be sent either via the output signal converter 106 to the operator indicator 164 or through the external communication channel 172 to a computer (not shown) in the vehicle 30.

Acquired data (from in-service data 174) that is required for future analysis (discussed below) is stored in the non-volatile memory 102B.

Figure 6:
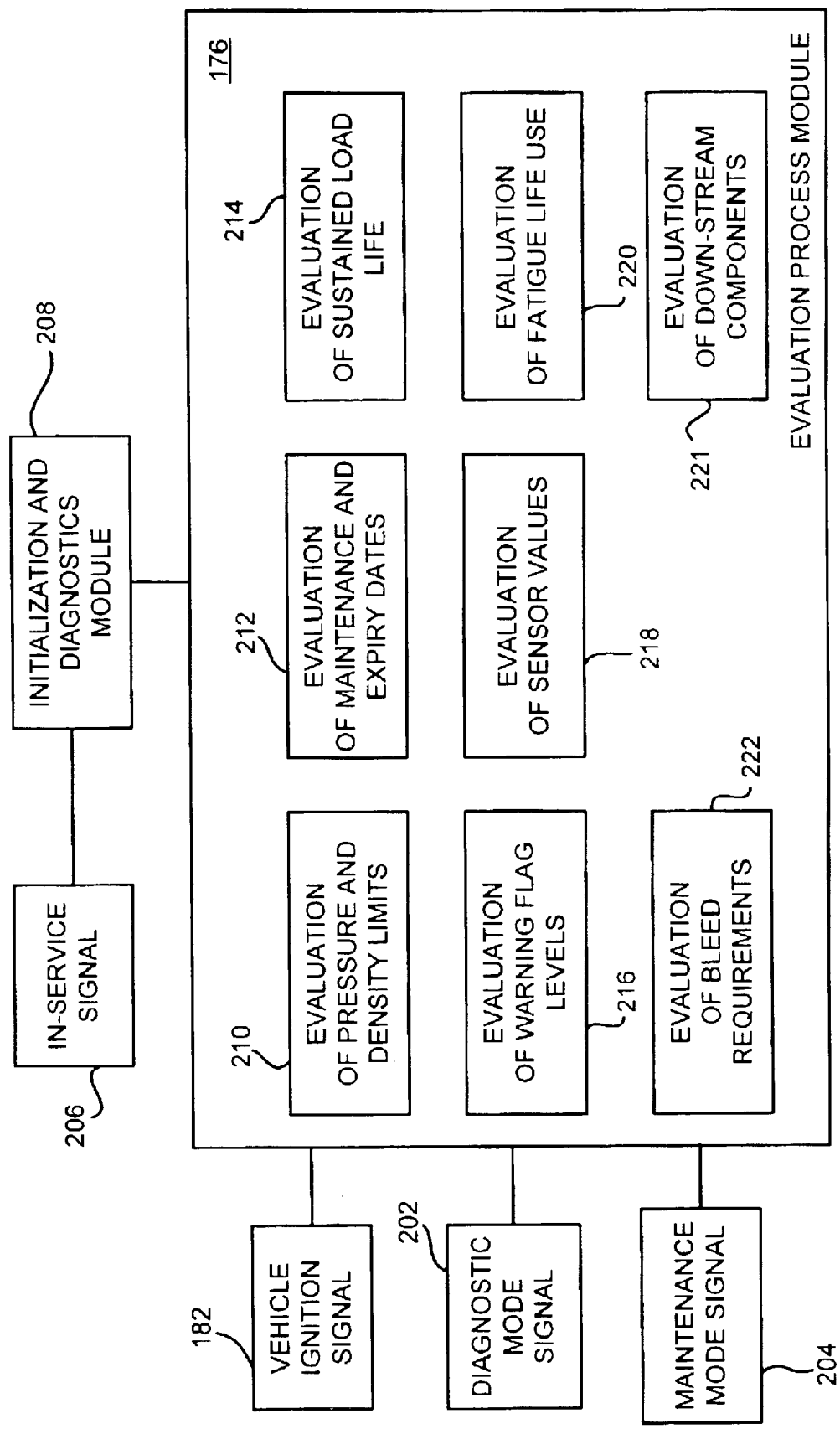
FIG. 6 shows a block diagram illustrating details of the evaluation process module of FIG. 5.
Figure 7A:
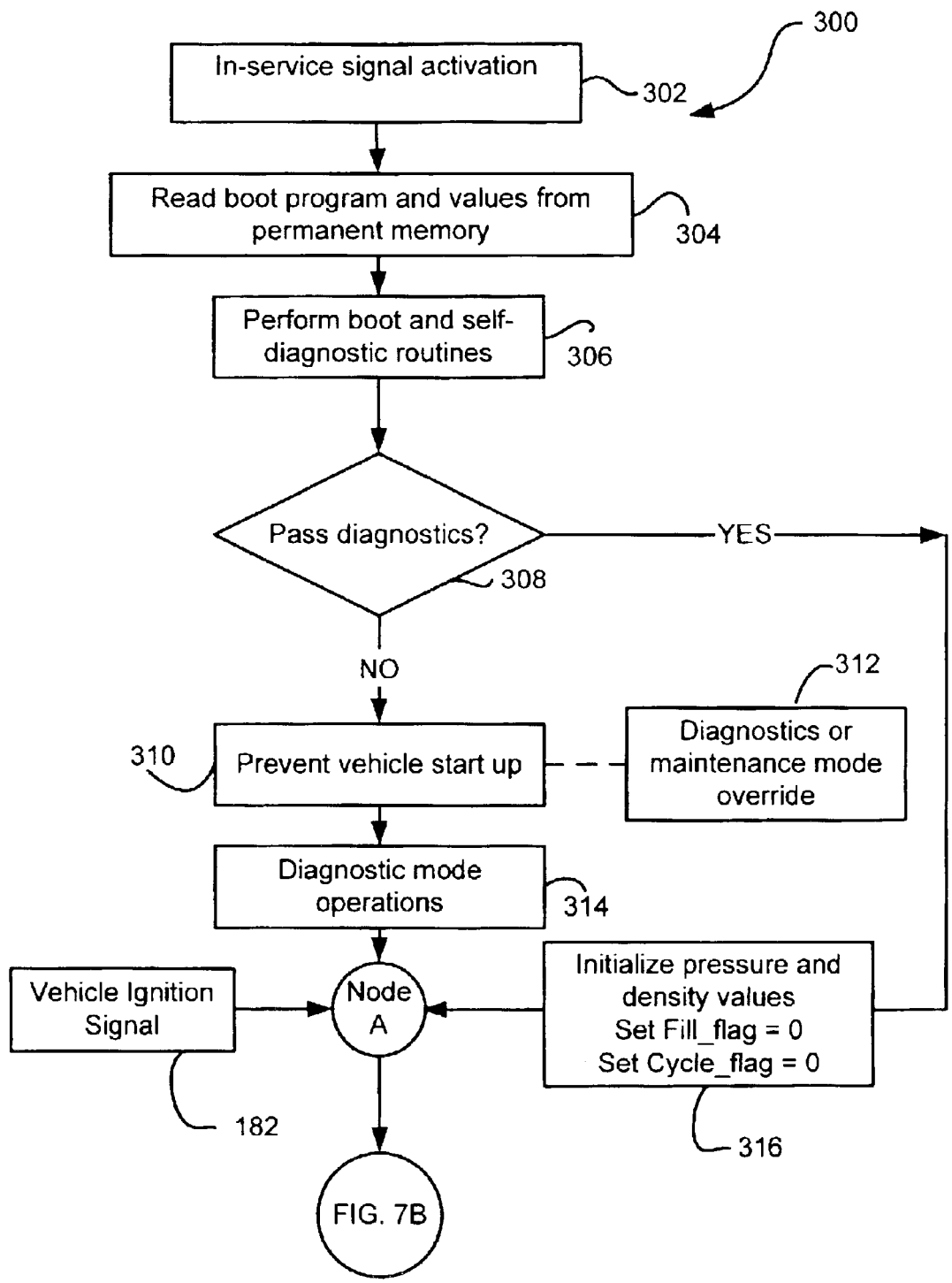
FIGS. 7A, 7B, 7C, 7D, and 7E show a flow chart of the operation of the diagnostic system according to an embodiment of the present invention.
Figure 7B:
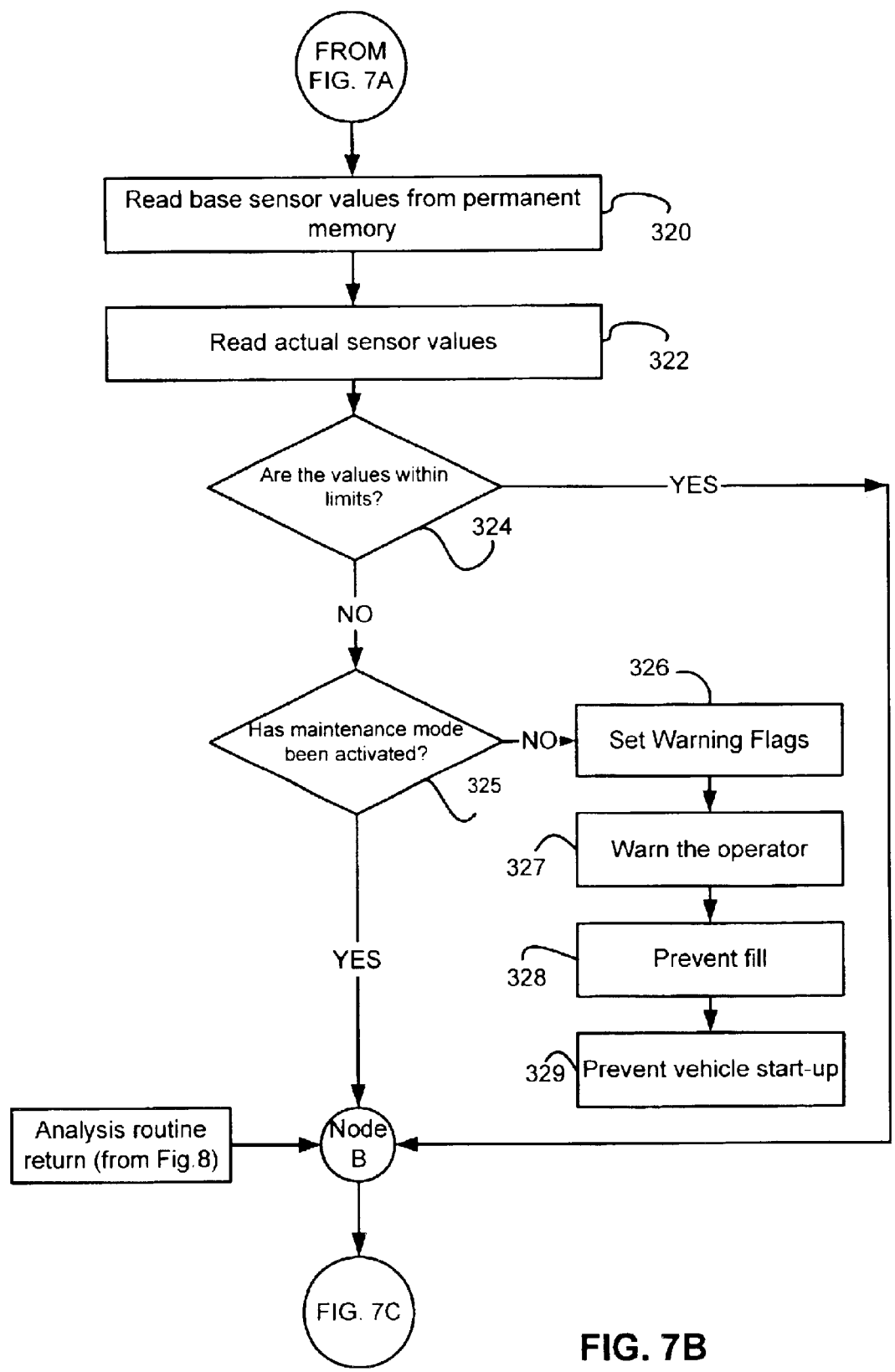
Figure 7C:
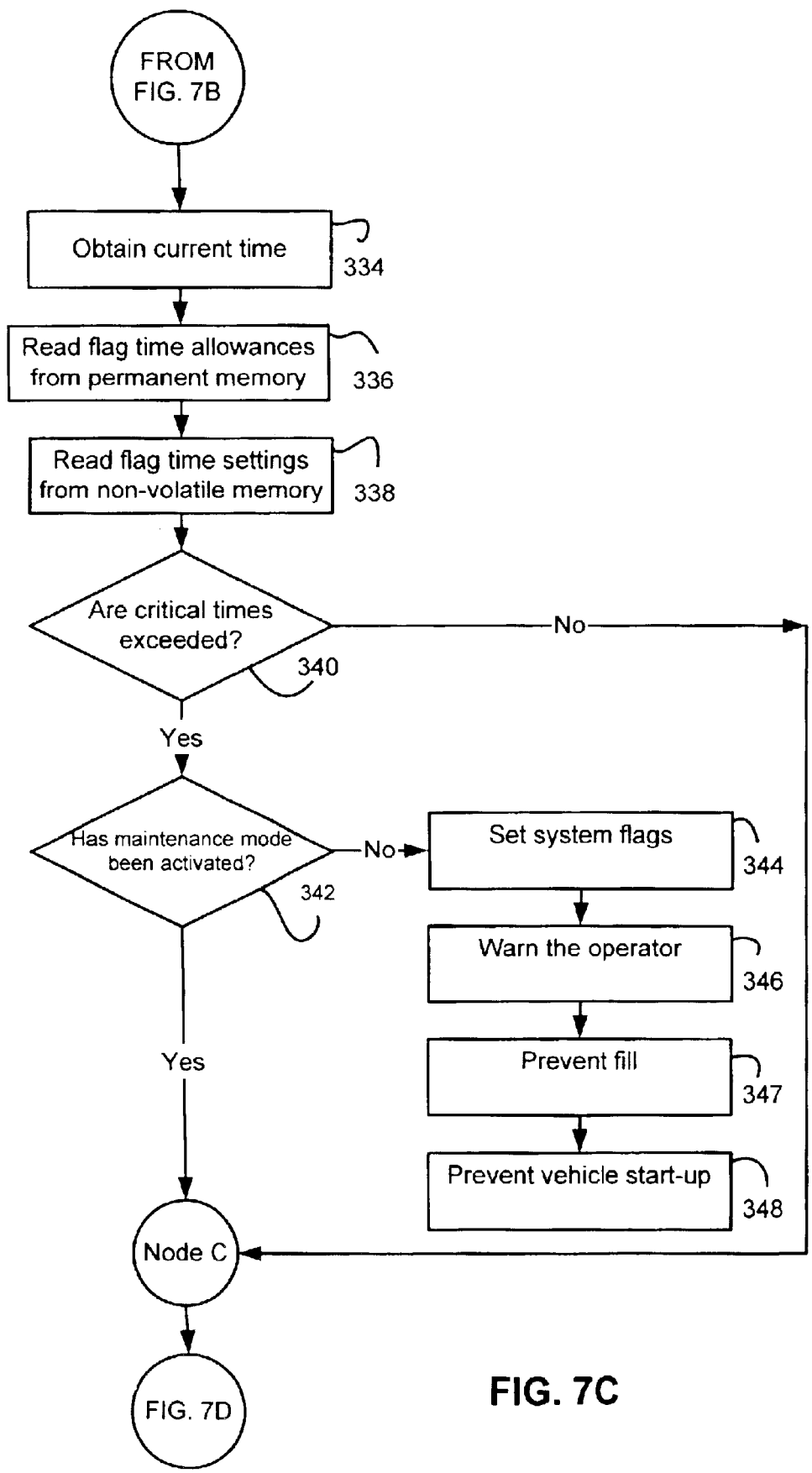
Figure 7D:
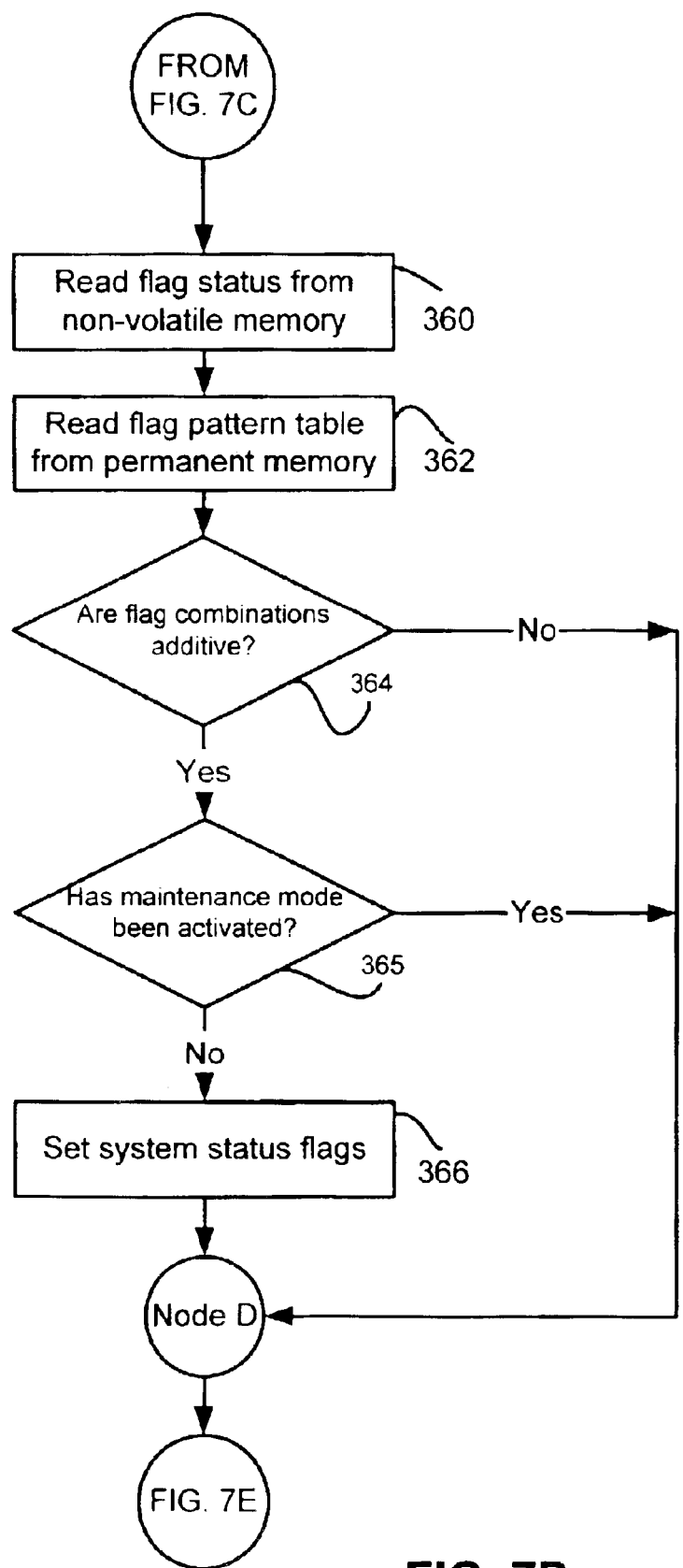
Figure 7E:
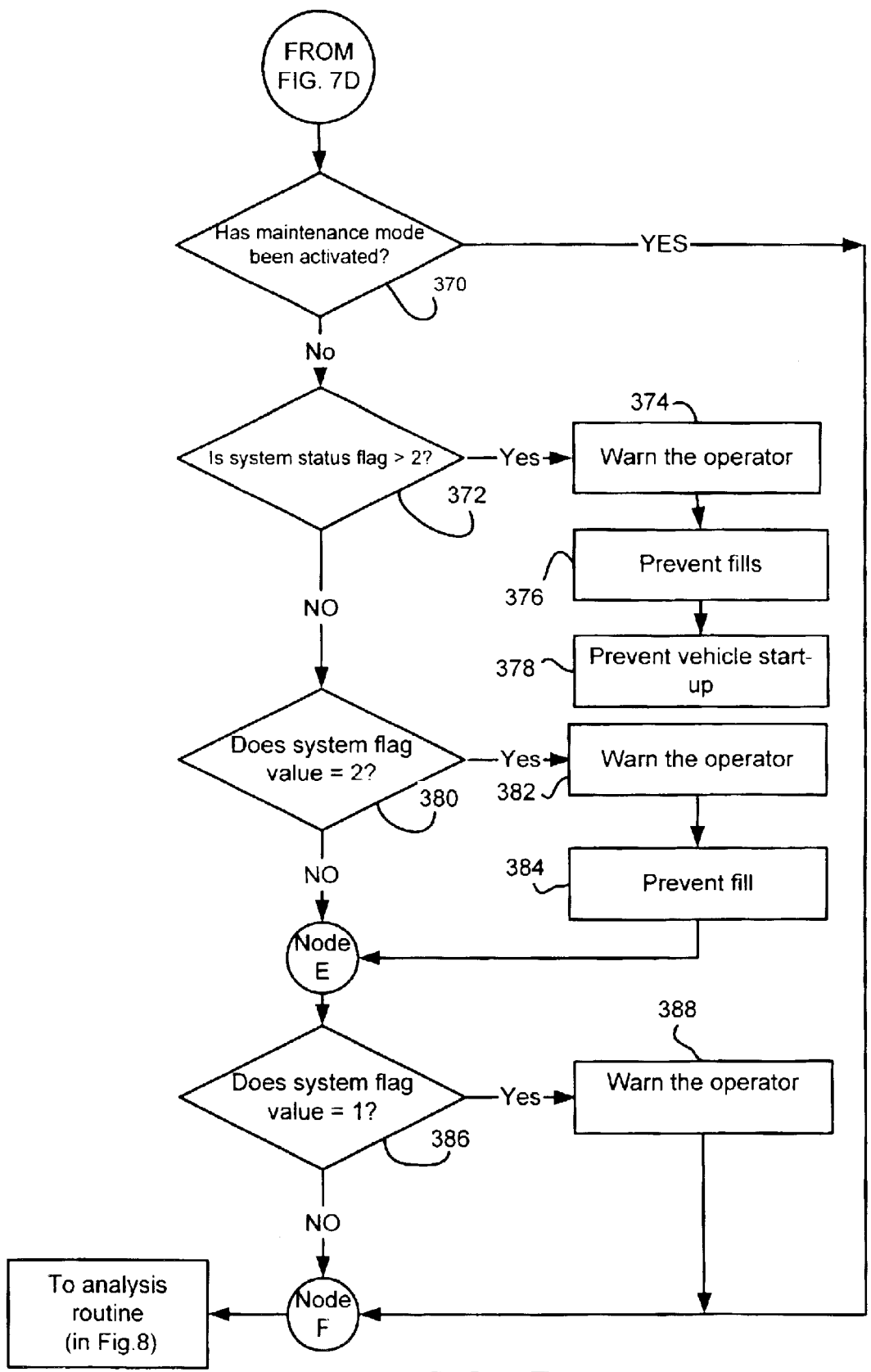
Figure 8A:
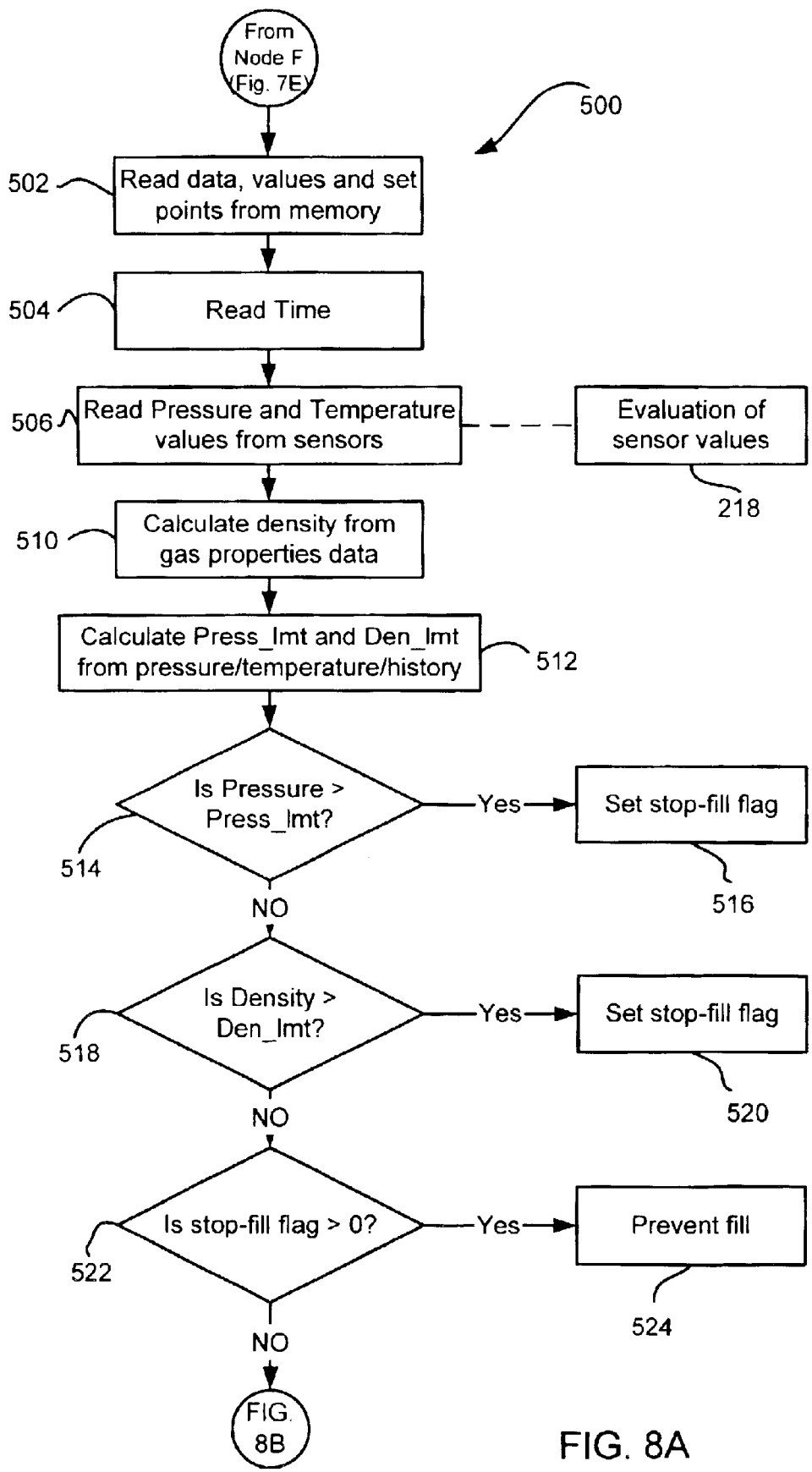
FIGS. 8A, 8B, 8C, 8D, 8E, 8F, and 8G show a flow chart of sensor analysis routines managed by the controller of the diagnostic system according to an embodiment of the present invention.
Figure 8B:
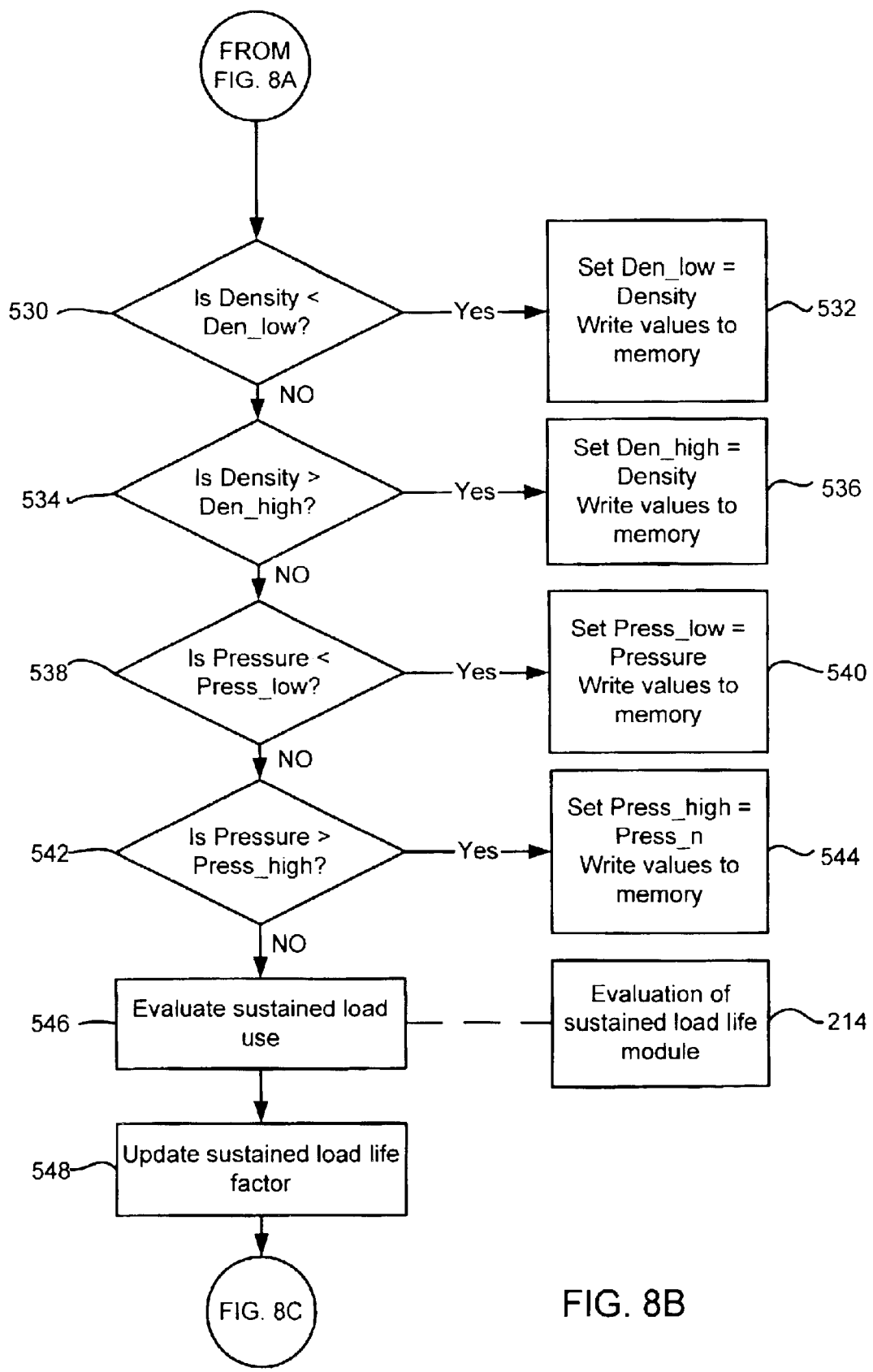
Figure 8C:
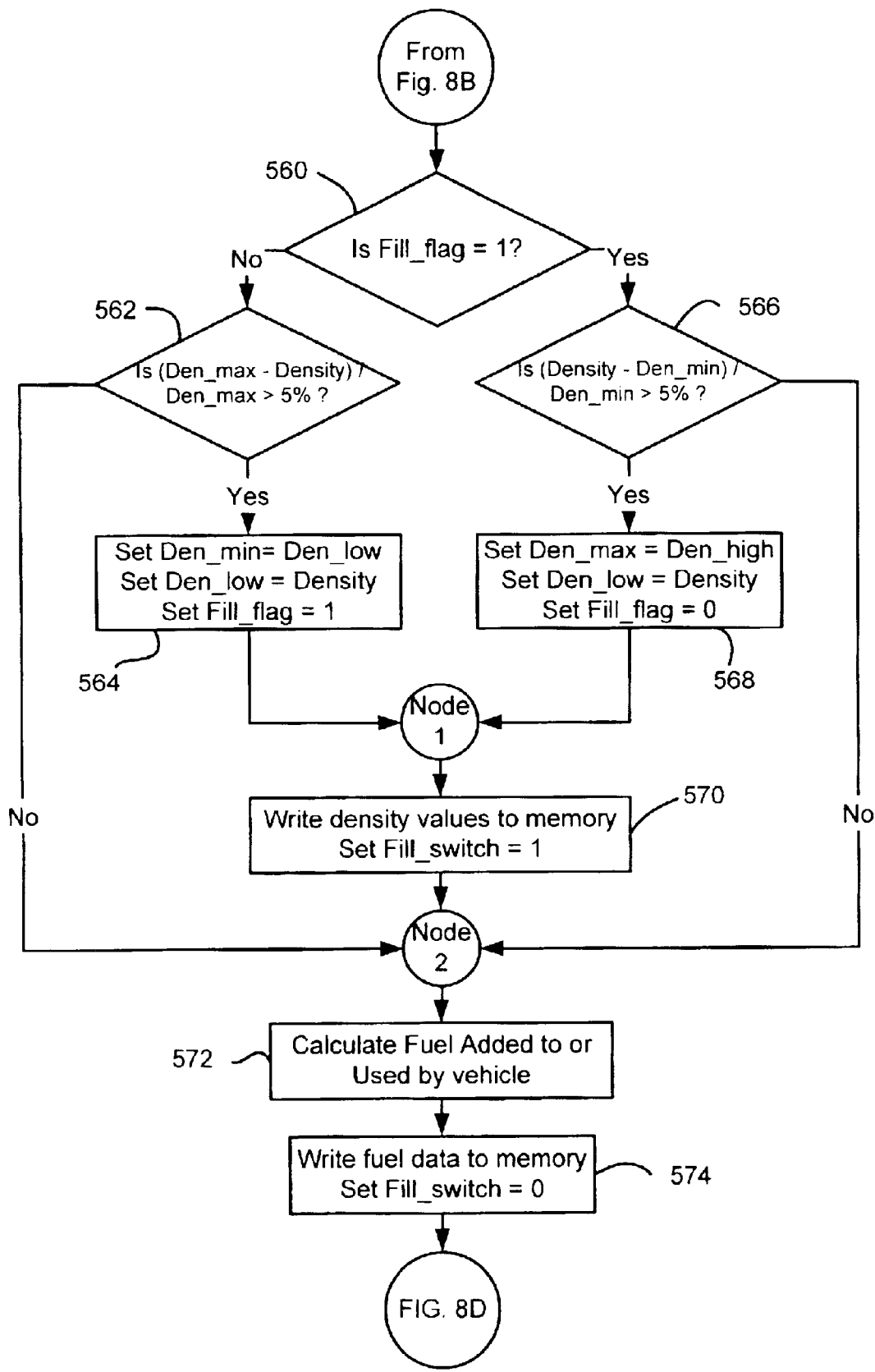
Figure 8D:
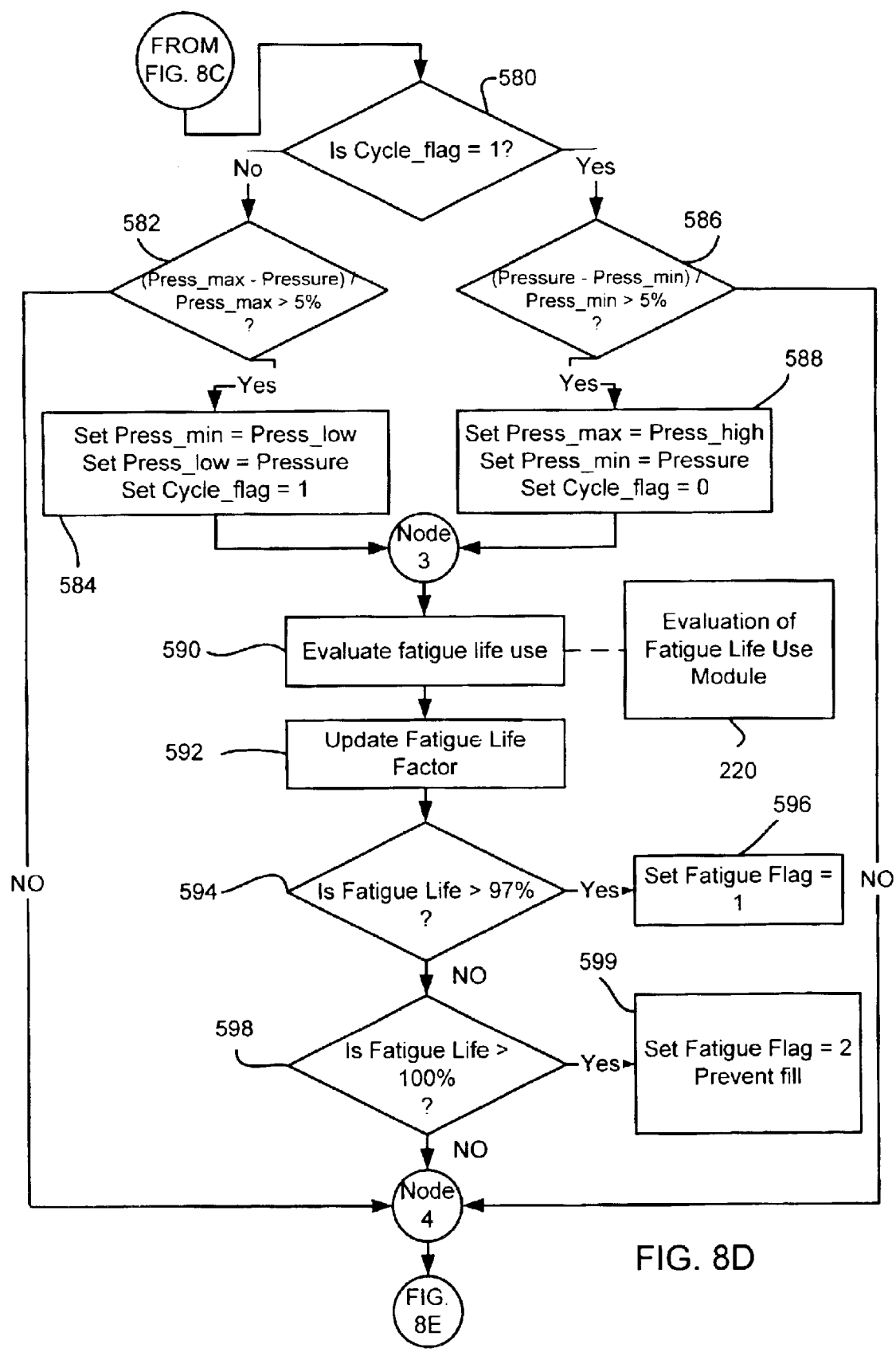
Figure 8E:
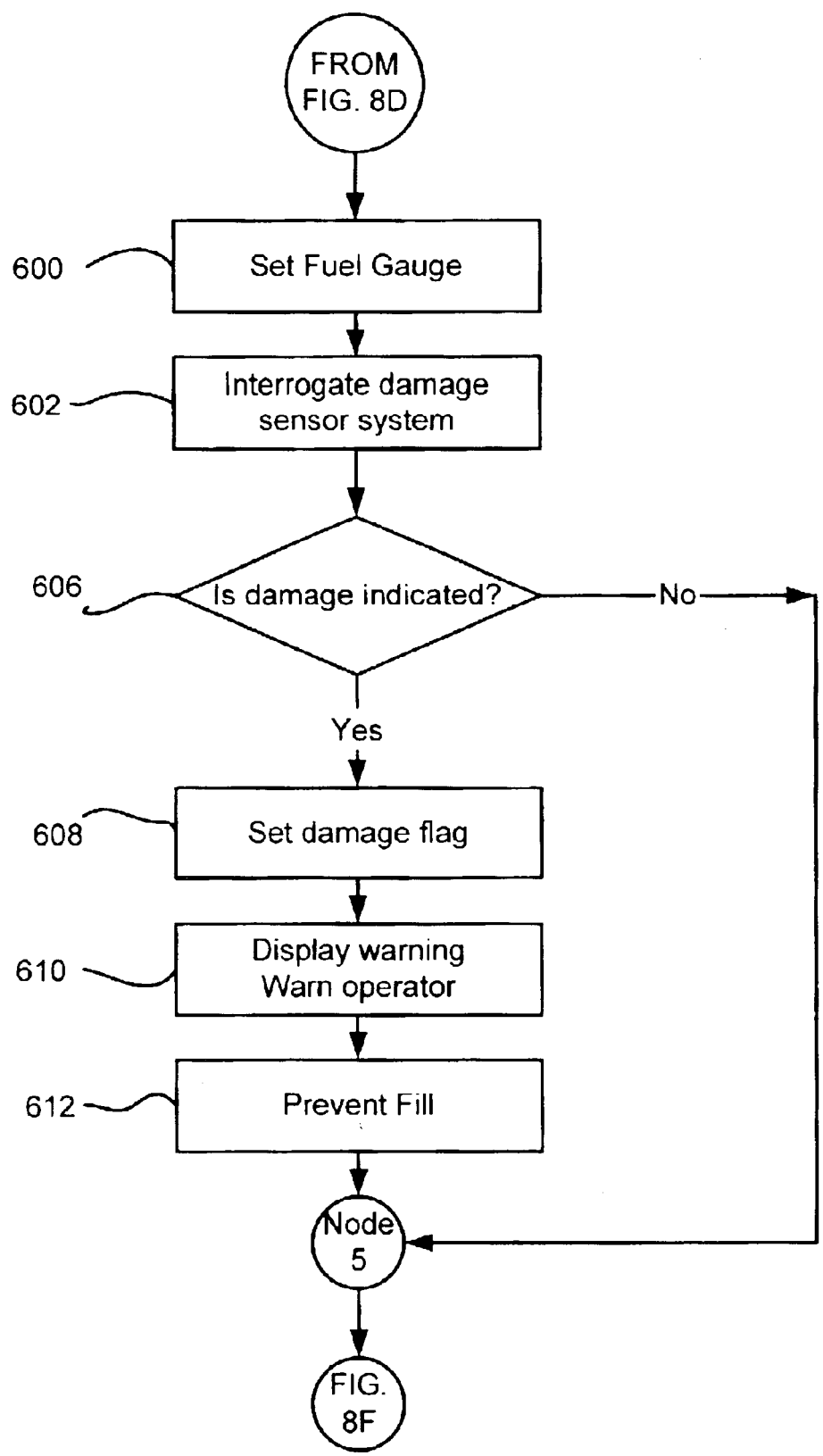
Figure 8F:
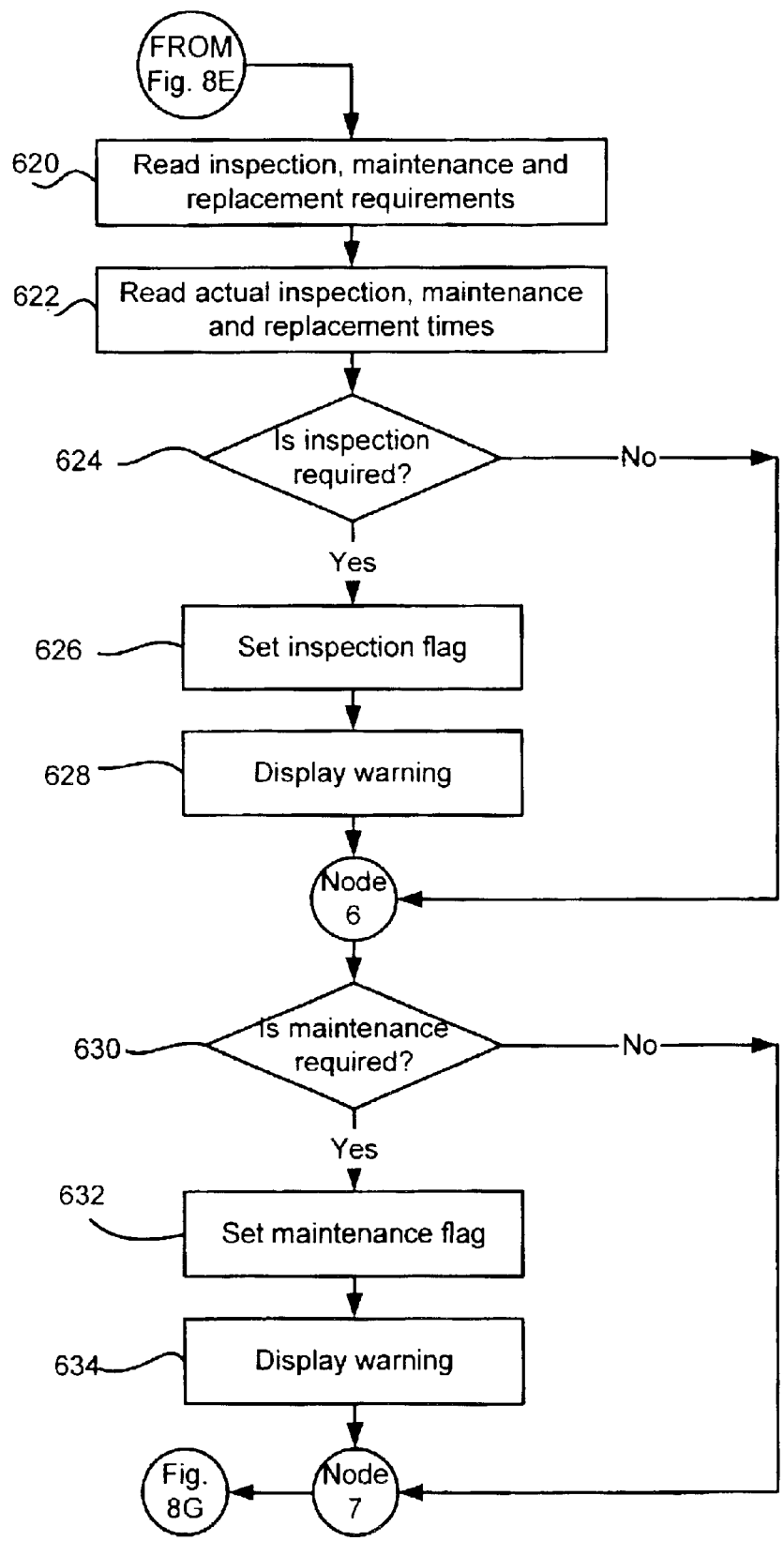
Figure 8G:
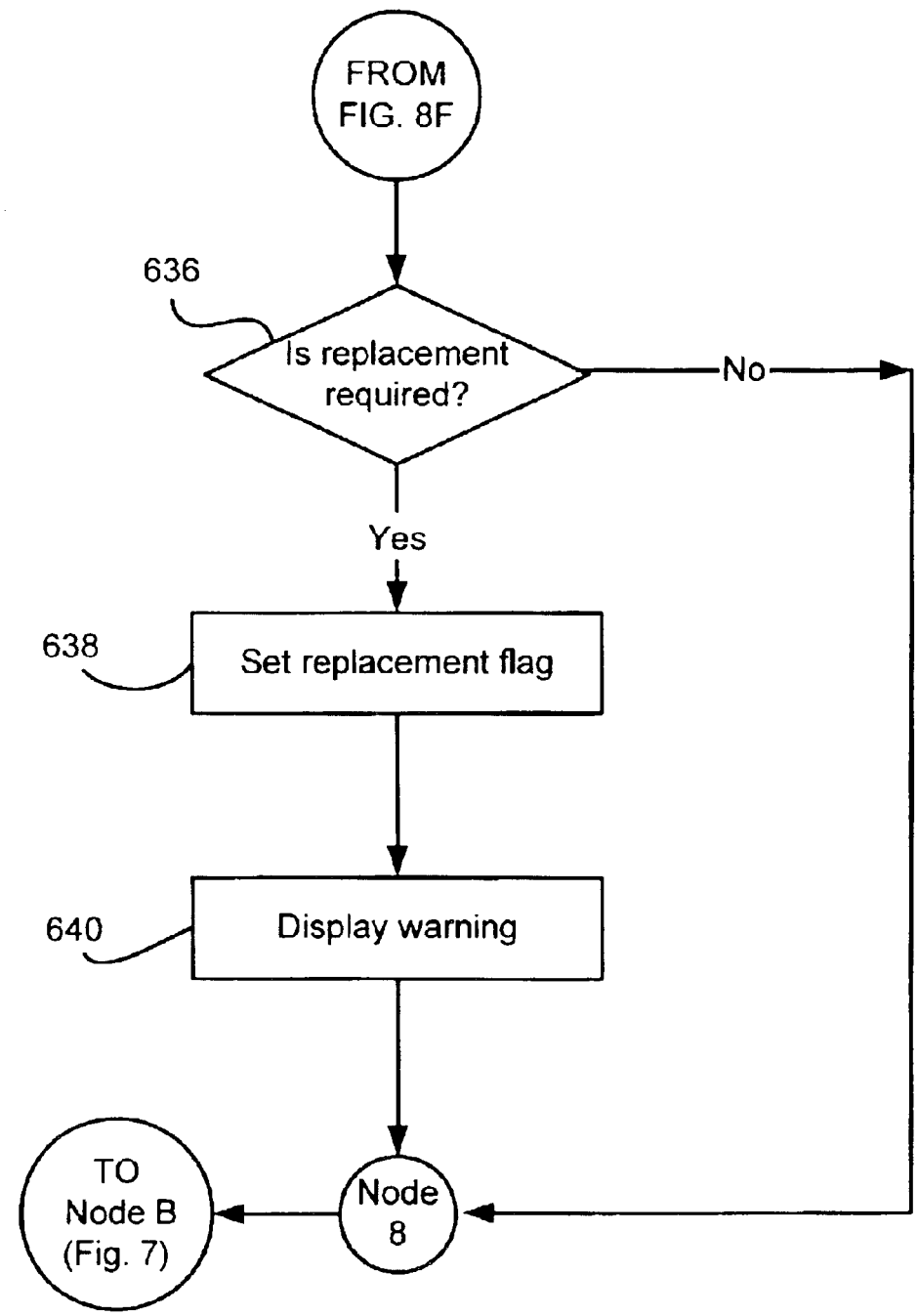

An evaluation process module 176 interacts with the controller 150 to use the signals 152–158 from the sensors 62, 66, 68, and 70 to drive the indicators/actions 160–168 (discussed in detail in conjunction with FIG. 6).

The controller 150 obtains time data from the clock circuit 108 (shown in FIG. 4) and uses the information as follows: (a) to establish maintenance and service intervals; (b) for data acquisition from the input signal converter 104; and (c) to trigger the sensor control indicators 166 and in the execution of evaluation processes managed by the evaluation process module 176.

The controller 150 uses system information from a system information module 170 together with switching information from the system status module 116 in conjunction with the vehicle ignition signal 182 to determine the type of evaluation process 176 to execute. (discussed with reference to FIG. 6)

During the operation of the control system 12, the processor module 100 establishes a series of flags. Different flags are used to indicate the status of individual components of the fuel storage system 10. Although the number of severity levels for a flag may be varied for convenience, the example illustrated uses four levels as shown in the following table.

EXAMPLE

Status Flag Indicators

| Flag Level | Description |
| --- | --- |
| 0 | Operation values are normal and within safety limits. |
| 1 | A problem is detected that should be attended to during the next scheduled maintenance. |
| 2 | A situation has occurred whereby no further fuel should be added to the system but the vehicle may continue to be used. |
| 3 | A situation has occurred whereby it is considered unsafe to operate the vehicle. |

The flag severity levels will increase at predetermined intervals if problems are not resolved and certain patterns of flags sent by individual components may set overall system flags, which have a higher severity level.

Furthermore, when a flag is set, a record is written to the non-volatile memory 102B with calendar time and other system information that is necessary for analysis and diagnostics. This record may be changed, for example, by persons with authorization by invoking the maintenance mode switch 116C in the system status module 116.

Various processing routines managed by the evaluation process module 176 of the control system 12 are illustrated in FIG. 6. The evaluation process module 176 receives a number of input signals, which are used to perform various evaluations to provide the necessary output signals as discussed above (including fill restriction line 160, warning signal indicators 162, etc.). The input signals to the evaluation process module 176 are either passed directly to the module 176 or through the controller 150 as discussed in FIG. 5.

The input signals include the vehicle ignition signal 182 (discussed in FIG. 5) generated by the vehicle 30 during start-up, a diagnostic mode signal 202 generated by the diagnostic mode switch 116B, a maintenance mode signal generated by the maintenance mode switch 116C, and an in-service signal 206 generated by the in-service switch 116A. The in-service signal 206 can drive various initialization and diagnostics processes in an initialization and diagnostics module 208 when the control system 12 is place in an in-service mode.

The evaluation process module 176 performs the following functions using the input signals (182, 202, 204, and 206):

(a) evaluation of pressure and density limits 210;
(b) evaluation of maintenance and expiry dates 212;
(c) evaluation of sustained load life 214;
(d) evaluation of warning flag levels 216;
(e) evaluation of sensor values 218;
(f) evaluation of fatigue life use 220;
(g) evaluation of down-stream components 221; and
(h) evaluation of bleed requirements 222.

The evaluation of pressure and density limits 210 determines limiting values of the pressure and density to which the high-pressure gas storage assembly 15 may be safely filled.

The evaluation of maintenance and expiry dates 212 compares the current date with required maintenance dates and expiry dates stored in the memory module 102 for the continued use of components.

The evaluation of sustained load life use 214 determines what fraction of the sustained load life of the high-pressure gas storage assembly 15 has been used since the last update.

The evaluation of warning flag levels 216 determines if another routine or routines have set flags whereby operation of the vehicle 30 should be restricted.

The evaluation of sensor values 218 obtains sensor signals and performs the necessary signal conditioning and analysis to ensure that stable representative values are obtained from the sensors.

The evaluation of fatigue life use 220 determines what fraction of the fatigue life use of the high-pressure gas storage assembly 15 has been used since the last update.

The evaluation of fatigue life use 220, down-stream components 221 and bleed requirements 222 will be discussed in more detail below in relation to other exemplary processes for enhancing safety.

An embodiment of a tank diagnostic method 300 according to the present invention is described in conjunction with the flow charts of FIGS. 7A–E. When the system 10 is placed in service the in-service switch 116A is activated generating the in-service signal 206 that activates the tank diagnostic method 300 at step 302. A boot or initialization program (residing in the module 208) is read and baseline values are obtained from the permanent memory 102A at step 304.

At step 306 the control system 12 performs internal diagnostics known to those skilled in the art. At step 308 the results of those diagnostic tests are compared to the predetermined values obtained at step 304 and, if the diagnostic test is passed, processing proceeds to step 316.

At step 316 the pressure and density maximum and minimum values are initialized to the current values and processing proceeds to Node A. These values are obtained from the temperature signal 152 and pressure signal 154, the fill flag and the cycle flag are set to zero.

If diagnostics fail (at step 308), then a failsafe mode is invoked to prevent vehicle start up at step 310. This can be overridden by activating the diagnostic mode switch 116B or the maintenance mode switch 116C in step 312, enabling a person to diagnose and resolve the problems at step 314 with diagnostic mode operations.

Further, when the normal operation of the controller 150 is interrupted activation of the diagnostic mode switch 116B or maintenance mode switch 116C will also transfer control at step 310.

During normal operations turning on a vehicle ignition circuit (not shown) produces the vehicle ignition signal 182 that instructs the controller 150 to transfer control to Node A.

Proceeding from Node A, base sensor values are read from the permanent memory 102A at step 320 and actual sensor values (e.g., from temperature signal 152, pressure signal 154, damage signal 156 and shock signal 158) are read from the respective sensors at step 322. These values are compared at step 324 and, if they are within the critical limits obtained at step 320, control is passed to Node B.

If the values exceed the critical limits the controller 150 checks to determine if it is in maintenance mode at step 325 by reading the value of the system status signal 180 from the maintenance mode switch 116C. If the system is not in maintenance mode then warning flags are set at step 326, warning signals 162 (visual or auditory) are issued to the operator at step 327, the fill restriction control line 160 is set at 328 and the vehicle operation restriction line 168 is activated at step 329 immobilizing the vehicle 30. Processing then halts until the system is reactivated by setting the diagnostic mode switch 116B or maintenance mode switch 116C.

If the controller 150 determines that the vehicle 30 is in maintenance mode then control is passed to Node B. Node B is also the return point for analysis routines discussed with reference to FIG. 8.

Proceeding from Node B, processing begins by obtaining a current value of time from the clock circuit 108 at step 334. Time allowances for the warning flags, set at step 326, are read from the permanent memory 102A at step 336. Times at which warning flags have been set are read from the non-volatile memory 102B at step 338.

Each warning flag is assigned a period during which the situation it is identifying must be resolved. At step 340 the controller 150 determines if the time allowances for warning flags obtained at step 336 have been exceeded. If the time allowance for any flag has not been exceeded control is passed to Node C.

If flag time allowances have been exceeded, the controller 150 checks to determine if it is in maintenance mode at step 342 by reading the value of the system status signal 180 from the maintenance mode switch 116C. If the system 10 is not in maintenance mode then warning flags are set at step 344, warning signals 162 are issued to the operator at step 346, the fill restriction control line 160 is set at 347, preventing a fill and the vehicle operation restriction line 168 is activated at step 348, immobilizing the vehicle 30.

If the vehicle is in maintenance mode then control from 150 is allowed to pass from step 342 to Node C. Proceeding from Node C, processing begins by obtaining the status of all warning flags from the non-volatile memory 102B at step 360. A flag pattern table is read from the permanent memory 102A at step 362 and the controller 150 determines if the combination of warning flags requires that system status flags be set at step 364.

With respect to additive flag combinations, since a combination of less severe items can result in a greater hazard, provisions are made at step 364 so that the controller 150 may evaluate warning flag combinations and set a system status flag to a higher level. For example, two level 1 warning flags will cause a system status flag to be set to level 2; two level 2 warning flags or one level 2 warning flag plus two or more level 1 warning flags will cause a system status flag to be set to level 3.

If no actionable warning flag situations are determined at step 364, then processing proceeds directly to Node D. If an actionable pattern is detected at step 364, control passes to step 365 where the controller 150 determines if the vehicle is undergoing maintenance by reading the maintenance mode switch 116C. If the system is in maintenance mode, control passes directly to Node D.

If the system is not undergoing maintenance then system status flags are set at step 366 before passing active control to Node D. Proceeding from Node D, processing begins at step 370 where the controller 150 determines if the vehicle is undergoing maintenance by reading the signal from the maintenance mode switch 116C. If the vehicle is undergoing maintenance then control passes directly to Node F.

If the vehicle is not undergoing maintenance then control passes to step 372 where the controller 150 determines if the system status flag is greater or equal to 3. If it is less than 3, control passes to step 380, otherwise a warning signal 162 is issued to the operator at step 374, the fill restriction control line 160 is activated at step 376 and the vehicle 30 is immobilized by setting the vehicle operation restriction line 168 at step 378.

Processing is then halted until the system is reactivated, by activating the diagnostic mode switch 116B or maintenance mode switch 116C. If the system status flag is less than 3, control passes to step 380 where the controller 150 determines if the system status flag is equal to 2. If the system status flags are equal to 2, then a warning signal 162 are issued to the operator at step 382 and the fill restriction control line 160 is set at step 384 before control is passed to Node E. If the system status flag is not equal to 2, control passes directly from step 380 to Node E.

Proceeding from Node E, the controller 150 determines if the system status flag is equal to 1 at step 386. If the system status flag is equal to 1 then warning signals 162 are issued to the operator at step 388 before proceeding to Node F.

If the system signal flag is not equal to 1 then control proceeds directly to Node F. Analysis routines according to the present invention begin from Node F and will be discussed in detail in conjunction with FIG. 8.

A series of analysis routines 500 according to the present invention are illustrated in the flow chart of FIGS. 8A–G. At step 502 data, set points and values that are provided in permanent memory 102A or previously calculated and stored in the non-volatile memory 102B are read into the working memory 102C for use in calculations by the controller 150.

The current time is then obtained at step 504 from the clock circuit 108. At step 506 the pressure signals 154 and internal temperature signals 152 are read by the controller 150 after conversion to digital format by the input signal converter 104. As will be known to those skilled in the art, these must be conditioned by the evaluation of sensor values, module 218, to remove transient and spurious values.

At step 510, if a sensor for directly measuring density is not used, the density of the fuel is calculated using internal temperature and pressure data, obtained at step 506, and the values obtained at step 502.

At step 512 the maximum allowable pressure limits for the high-pressure gas storage assembly 15 are calculated using the current temperature and historic data on the high-pressure gas storage assembly 15 service history, obtained at step 502. As will be known to those skilled in the construction and use of high-pressure gas storage assemblies the maximum allowable pressure will depend on the current temperature of the gas, the previous use of the high-pressure gas storage assembly 15, the materials used in the construction of the high-pressure gas storage assembly 15 and the fabrication techniques.

At step 514 the current pressure is compared with the maximum allowable pressure limit calculated at step 512 and, if the current pressure is greater than the maximum allowable pressure, limit then a stop-fill flag is set at step 516. Proceeding to step 518, the current density is compared to the maximum allowable density (Den_Imt) and, if the density is greater than the maximum allowable density limit, then a stop-fill flag is set at step 520.

The gas pressure and density are related to the temperature, however to accommodate for possible variations in fuel compositions then these parameters are independently set. As a further feature the relationship between density, temperature and pressure for the current fuel composition may be calculated in module 210 by evaluating changes to the internal temperature and pressure while the vehicle is not operating.

At step 522 the controller 150 determines the status of the stop-fill flag and if it is set to one then the fill operation prevention line 160 is activated at step 524, preventing further fuel being added to the vehicle 30.

In this example, high and low values of density and pressure are determined in a series of steps beginning at step 530. At step 530 the current density is compared to the Den_low value in memory and if the value is lower then the Den_low value is set to the current density at step 532.

At step 534 the current density is compared to the Den_high value in memory and if the value is higher, then the Den_high value is set to the current density at step 536. At step 538 the current pressure is compared to the Press_low value in memory and if the value is lower then the Press_low value set to the current pressure at step 540.

At step 542 the current pressure is compared to the Press_high value in memory and if it is higher then the Press_high value is set to the current pressure at step 544.

Proceeding to step 546 the sustained load life use is evaluated by calling the evaluation of sustained load life use 214 and then updating the sustainable load life factor at step 548. As will be known to those skilled in the art of construction and use of high-pressure gas storage assemblies, the safe service life of any assembly is dependant on the duration that a high-pressure gas storage assembly 15 spends at any particular temperature and pressure. The values that describe the relationship are constant for any particular design based on the materials and methods of construction and are stored in permanent memory 102A.

The different components of the high-pressure gas storage assembly 15 may have different values and in such cases each component must be evaluated separately.

Proceeding to step 560, an example technique for determining fill cycles is shown (discussed below). As an alternative, some vehicles may be fitted with a system that provides a direct signal (not shown) to the controller 150 when the vehicle is being filled with fuel. In this case a Fill_flag would not be used and control could be transferred directly to Node 2.

The system controller 150 determines the status of the Fill_flag at step 560. If the value of the Fill_flag is not equal to one control passes to step 562. At step 562 the controller 150 determines if the maximum density (Den_max) is greater than the current density by a predetermined amount obtained at step 502. If it is not greater, control proceeds to Node 2. If, at step 562, the current density is more than the predetermined amount, obtained at 502, processing is transferred to step 564 where the value of the Den_min is set to the value of the Den_low, the value of the Den_low is set to the value of the current density and the Fill_flag is set to one. Control then passes to Node 1.

If at step 560, the controller 150 determines that the status of the Fill_flag is equal to then control passes to step 566. At step 566 the controller 150 determines if the current density is greater than the previously recorded minimum density (Den_min) by a predetermined amount obtained at step 502. If it is not greater, control proceeds to Node 2. If, at step 566, the current density is more than the predetermined amount, obtained at 502, processing is transferred to step 568 where the value of the Den_max is set to the value of the Den_high, the value of the Den_low is set to the value of the current density and the Fill_flag is set to zero. Control then passes to Node 1.

Proceeding from Node 1, a Fill_switch is set to one at step 570 indicating to the controller 150 that a fuelling cycle has been initiated or has ended. Control then passes to Node 2. Proceeding from Node 2 at step 572, the fuel that has been added to or consumed by the vehicle 30 is calculated using the values of Den_max and Den_min, the status of the Fill_flag and system constants obtained at step 502.

At step 574 the Fill_switch is reset to zero and the calculated fuelling information is written to the non-volatile memory 102B where it can be accessed for maintenance use.

Proceeding to step 580, the occurrence and amplitude of pressure cycles is determined. Pressure cycles in a high-pressure gas storage assembly 15 can originate for a number of reasons. In vehicles these include: the normal filling and use of fuel in a vehicle; changes caused by changes in ambient temperatures and from Joule-Thompson cooling of the fuel in the high-pressure gas storage assembly 15.

The decrease in life of a high-pressure gas storage assembly 15 is a function of the materials of construction, the methods of construction and the number and amplitude of the pressure cycles to which the high-pressure gas storage assembly 15 has been subject. The values that describe this relationship are constant for any particular design and are stored in the permanent memory 102A.

In general, low amplitude cycles may be neglected and a process to detect pressure cycles is illustrated starting at step 580. At step 580 the controller 150 determines if the high-pressure gas storage assembly 15 is in the downside or upside of a pressure cycle by reading the Cycle_flag.

At step 580, if the controller 150 determines that the Cycle_flag is not equal to one (i.e. equals zero), indicating that the system 10 is on the upside of a pressure cycle, control is passed to step 582. At step 582 the controller 150 determines if the pressure has dropped during a cycle by more than the predetermined amount, obtained at 502. If it has dropped by more than the predetermined amount then control is passed to step 584. At step 584 the controller sets the Press_min to equal the value of the Press_low, the low pressure value Press_low equal to the current pressure and changes the Cycle_flag to one, indicating that the system is now in a downside cycle. If at step 582 the controller 150 determines that the pressure has not dropped by more than the predetermined amount, obtained at 502, control passes directly to Node 4.

If at step 580 the Cycle_flag equals one, indicating that the system 10 is on the downside of a pressure cycle, control is passed to step 586. At step 586 the controller 150 determines if the pressure has increased by more than the predetermined amount, obtained at 502. If it has increased by more than the predetermined amount then control is passed to step 588. At step 588 the controller sets the Press_max to equal the value of the Press_high, the Press_high value equal to the current pressure and changes the Cycle_flag to zero, indicating that the system 10 is now in a upside cycle. If at step 586 the controller 150 determines that the pressure has not increased by more than the predetermined pressure, obtained at 502, control passes directly to Node 4.

Proceeding from Node 3, at step 590, the controller 150 evaluates the fatigue life that has been used during the pressure cycle by using the algorithms stored in the evaluation of fatigue life use module 220 and control is passed to step 592.

Proceeding to step 592 the remaining fatigue service life is updated by subtracting the value calculated by the evaluation of fatigue life use module 220 and control is passed on at step 594.

At step 594 the remaining fatigue life is compared by the controller 150, to the predetermined value, obtained at step 502. If that value has been exceeded the fatigue life flag is set to one at step 596 for use by the evaluation of warning flag levels module 216. Proceeding to step 598, the controller 150 determines if the fatigue life has been exceeded. If the fatigue life of the high-pressure gas storage assembly 15 has been exceeded at step 599 the fatigue flag is set to a higher level and the fill restriction control line 160 is activated to prevent additional fuel from being added to the vehicle. Control is then passed to Node 4.

On completion of the above operations, fill level information is communicated at step 600 either through the operator indicators 164 or through the external communications channel 172, of the control system 12, to the vehicle 30 were the information may be used in the same way as a traditional fuel gauge.

The next operation involves interrogation of the damage sensor 68 at step 602. The damage signal 156 processed by the controller 100 is sent from the output signal converter 106 to the sensor control lines 166.

If there are indications of damage, determined at step 606, to the storage vessel 14, then a damage flag is set at step 608, a warning is displayed to the operator at step 610, and the fuel fill system 160 is locked at step 612. As an alternative, if the damage appears to be of sufficient extent to create an immediate hazard, further steps may be taken, such as sounding alarms, using the external communication channel 172 to notify other parties, or shutting down the vehicle 30 totally. If there are no indications of damage, as determined at step 606, processing proceeds directly to Node 5.

The next series of steps involves determining if components of the system 10 require inspection, maintenance, or have exceeded their service life. Inspection dates, service intervals, and service life requirements are read from the permanent memory 102A at step 620. Actual inspection dates, service intervals, and service life are read from the non-volatile memory 102B at step 622 (this information is cumulated in the memory 102B based on the previously described activities).

If inspection is required as determined at step 624, then an inspection flag is set and recorded in non-volatile memory 102B at step 626 and a warning is transmitted to the operator at step 628. If inspection is not required, as determined at step 624, processing proceeds directly to Node 6.

If maintenance is required as determined at step 630, then a maintenance flag is set and recorded in non-volatile memory 102B at step 632 and a warning is transmitted to the operator at step 634. If maintenance is not required, as determined at step 630, processing proceeds directly to Node 7.

If replacement of components is required as determined at step 636, then a replacement flag is set and recorded in non-volatile memory 102B at step 638 and a warning is transmitted to the operator at step 640. If replacement is not required, as determined at step 636, processing proceeds directly to Node 8 and then returns to Node B (of FIG. 7).

As a further feature of the warning steps 628, 634, and 640, if inspection/maintenance/replacement is not performed within a certain time period or the values from the sensors reach dangerous values, further steps may be taken, such as sounding alarms, using the external communications channel 172 to notify other parties, or shutting down the vehicle 30 entirely. To prevent persons inadvertently overriding this feature, a protected warning flag could be set in the non-volatile memory 102B. Access is restricted to the protected warning flag so that only persons with knowledge of a password or other security device may reset it.

To summarize exemplary features of the invention: a fuel storage system including one or more vessels for storing pressurised gas, which include an internal volume accessible via an opening. A control valve is coupled to the opening for selectively connecting the vessel(s) to a fill system or to a withdrawal system. Sensing mechanisms are mounted on the vessel(s) for measuring various parameters by which the operation and the condition of the storage system may be determined. The sensing mechanisms are connected to a series of evaluation mechanisms, which also connect to a controller. The controller is operatively mounted to the vessel(s) for operating a control valve or other systems to inform the operator when the components need inspection, maintenance or replacement.

What is claimed is:

1. A monitoring and control system for a compressed gas fuel storage system having a storage vessel monitored by a plurality of sensors, each sensor generating an operating parameter signal, the system comprising:

an input controller for managing gas flow to the compressed gas fuel storage system;

an output controller for managing gas flow from the compressed gas fuel storage system; and a control system for managing the input controller and the output controller, the control system including:

a memory module for storing data related to design characteristics of the storage vessel, the data being representative of useful life characteristics of the storage vessel;

an input signal converter for receiving and conditioning the operating parameter signals from the plurality of sensors, the operating parameter signals being related to useful life characteristics of the storage vessel;

a processor module for evaluating the conditioned operating parameter signals provided by the input signal converter in relation to the data stored in the memory module to determine a status of the compressed gas fuel storage system;

an output signal converter for generating drive warning indicators based on the status of the compressed gas fuel storage system for controlling the input controller and the output controller; and a system status module managed by the processor module for allowing in-service switching to change operating modes of the fuel storage system.

2. The system of claim 1, wherein the system status module includes an in-service switch for placing the fuel storage system in a service mode, a diagnostic mode switch for placing the fuel storage system in a diagnostic mode and a maintenance mode switch for placing the fuel storage system in a maintenance mode.

3. The system of claim 2, wherein the plurality of sensors are selected from the group consisting of: temperature sensor; pressure sensor; and accelerometer.

4. A method of monitoring and controlling a compressed gas fuel storage system having a storage vessel monitored by a plurality of sensors, each sensor generating an operating parameter signal, the method comprising:

storing data related to design characteristics of the storage vessel, the data being representative of useful life characteristics of the storage vessel;

receiving the operating parameter signals from the plurality of sensors, the operating parameter signals being related to useful life characteristics of the storage vessel;

evaluating the operating parameter signals received by the input signal converter in relation to the data stored in the memory module to determine a status of the compressed gas fuel storage system;

generating drive warning indicators based on the status of the compressed gas fuel storage system for managing gas flow to and from the compressed gas fuel storage system; and switching between a plurality of operating modes of the fuel storage system in response to service requests.

5. The method of claim 4, wherein the plurality of operating modes includes an in-service mode, a diagnostic mode and a maintenance mode.

6. The method of claim 5, wherein the operating parameter signal includes a temperature of the storage vessel, a pressure in the storage vessel, and a density of gas in the storage vessel.

7. The method of claim 6, wherein the step of storing data includes:

(a) obtaining temperature limit data of the storage vessel;

(b) obtaining pressure limit data of the storage vessel; and (c) obtaining density limit data of the storage vessel.

8. The method of claim 7, wherein the step of evaluating includes comparing the respective obtained data of the storage vessel with the operating parameter signal from the respective sensor.

9. The method of claim 7, further comprising setting a stop-fill indicator when the pressure exceeds the pressure limit data to prevent further filling of gaseous fuel in the storage vessel.

10. The method of claim 7, further comprising setting a stop-fill indicator when the density exceeds the density limit data to prevent further filling of gaseous fuel in the storage vessel.

11. The method of claim 7, wherein the step of storing data includes:

(a) obtaining sustained load use data of the storage vessel; and (b) obtaining fatigue life use of the storage vessel.

12. The method of claim 11, further comprising:

evaluating an actual sustained load use and an actual fatigue life use of the compressed gas fuel storage system based on operating temperature and pressure.

13. The method of claim 12, further comprising setting a load use indicator when the actual sustained load use exceeds the sustained load use data to prevent further filling of gaseous fuel in the storage vessel.

14. The method of claim 12, further comprising setting a fatigue indicator when the actual fatigue life use exceeds the fatigue life use data to prevent further filling of gaseous fuel in the storage vessel.

15. The method of claim 6, wherein the operating parameter signal includes a damage value of the storage vessel.

16. The method of claim 15, wherein the step of storing data includes:

(a) obtaining damage limit data of the storage vessel.

17. The method of claim 16, wherein the step of evaluating includes comparing the obtained damage limit data of the storage vessel with the damage value operating parameter signal.

18. The method of claim 17, further comprising setting a damage indicator when the damage value exceeds the damage limit data to prevent further filling of gaseous fuel in the storage vessel.

* * * * *